3,592,857
PROCESS FOR PRODUCING ETHYLBENZENE HYDROPEROXIDE
Yoshiyuki Shinohara, Ohtake-shi, Japan, assignor to Mitsui Petrochemical Industries, Ltd., Tokyo, Japan
Filed Mar. 4, 1968, Ser. No. 710,140
Claims priority, application Japan, Mar. 8, 1967, 42/14,145
Int. Cl. C07c 73/06
U.S. Cl. 260—610B                              5 Claims

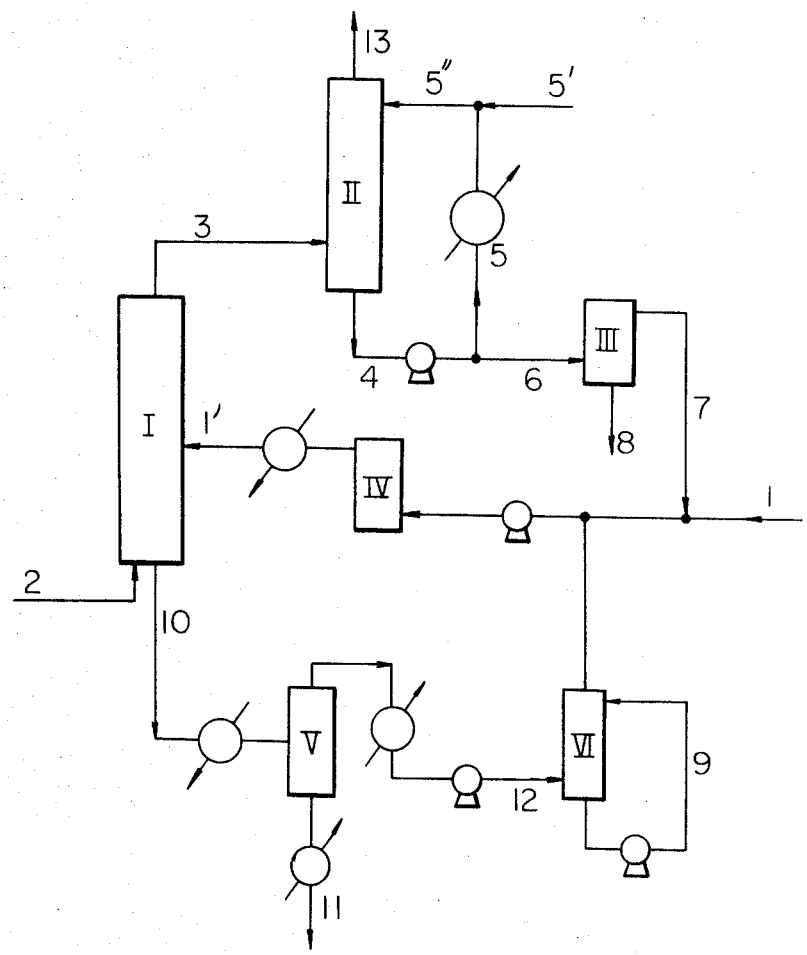

ABSTRACT OF THE DISCLOSURE

An improved process for producing ethylbenzene hydroperoxide by the liquid phase oxidation of ethylbenzene, which process includes the oxidation reaction step carried out in the reaction zone made of titanium, the alkali treatment step of discharged gas from said reaction zone in vapor phase, said gas being taken out under non-condensing condition from said zone and recovering step of ethylbenzene hydroperoxide.

---

This invention relates to a process for producing ethylbenzene hydroperoxide with a shortened reaction time as well as improvements in yield and purity and, in addition, without the possibility of dangers of explosion, thus accomplishing the production of ethylbenzene hydroperoxide with tremendous advantage commercially. More specifically, the invention relates to a process for producing ethylbenzene hydroperoxide which is characterized that in the liquid phase oxidation of ethylbenzene to ethylbenzene hydroperoxide by the use of an excess amount of molecular oxygen and at a pressure exceeding atmospheric pressure.

(i) At least the reaction zone portion which said liquid ethylbenzene comes into contact with is formed of titanium, and the liquid phase oxidation is carried out in said zone at a reaction temperature ranging from the boiling point of ethylbenzene to 200° C., preferably 150–180° C., and more preferably 165–175° C., under substantially anhydrous conditions, preferably in the absence of alkaline substances;

(ii) The unreacted ethylbenzene-containing gas discharged from said reaction-zone is taken out from said zone under non-condensing conditions and when still in its substantially vapor phase state is introduced from the reaction zone into an alkali treatment zone where the vent gas is quenched by being brought into contact with a cold aqueous alkali solution to form a condensate from which the fraction containing ethylbenzene is recovered and recycled to the reaction zone, while the aqueous solution layer and the waste gas are discharged externally of said treatment zone; and (iii) On the other hand, a liquid layer containing ethylbenzene hydroperoxide is recovered from said reaction zone.

It is well-known to carry out the liquid phase oxidation of ethylbenzene or isopropylbenzene (cumene) using molecular oxygen to produce the corresponding alkylbenzene hydroperoxides. This invention is directed particularly to the production of ethylbenzene hydroperoxide.

In thte case of the autoxidation of ethylbenzene, it is presumed to be a successive reaction wherein ethylbenzene hydroperoxide is formed from the ethylbenzene, after which the ethylbenzene hydroperoxide is oxidized and decomposed into acetophenone and alpha-phenethyl alcohol, and it is thought that the formation during the oxidation reaction of by-product acid substances which are presumed to be the decomposition products of ethylbenzene hydroperoxide, such as formic acid, benzoic acid and phenol, cannot be avoided more or less and that these by-product acid substances promote the decomposition of the intended product and/or impede the progress of the oxidation reaction.

With a view to minimizing the troublesome effects of such by-product acid substances, a means of neutralizing these by-product acid substances by the addition of an aqueous alkali solution to the reaction system has been proposed.

On the other hand, if it is intended to increase the reaction speed by raising the temperature of the oxidation reaction, it is known not only that the decomposition of the once formed hydroperoxide also increases and proceeds to such a degree that the control of the decomposition of the intended hydroperoxide in the reaction product becomes impossible such as to lead to an explosive decomposition, but that the material constituting the reaction zone with which the reaction liquid contacts also has a bearing, and hence that material such as iron and stainless steel being unsuitable, a reaction vessel made of or lined with such materials as Cu, Ag and the Cu-Ag alloy is preferably used.

For example, in the oxidation of cumene, as a means of avoiding the explosive decomposition, the following procedure is being adopted. Namely, for raising the concentration, i.e. the rate of formation, of the intended hydroperoxide in the reaction product and moreover preventing the formation of the troublesome by-product acid substances as well as the uncontrollable decomposition, a plurality of reaction zones whose reaction temperature have been progressively reduced are provided, the reaction being carried out first at the highest possible temperature to form a sytsem wherein intended hydroperoxide is formed to a concentration of a given level and thereafter carrying out the reaction by conducting the system successively to reaction zones of lower temperatures. This method is however not only a disadvantage from the standpoint of operations and equipment but also the reaction speed declines as the temperature is reduced. Hence, a decline in the yield and/or an increase in the reaction time is inevitable.

Further, when, say, iron or stainless steel is used as the material for constructing the reaction zone, an explosive decomposition of the ethylbenzene hydroperoxide takes place if the temperature inside the reactor exceeds 130° C., and particularly 140° C.

This tendency cannot be avoided substantially even though Cu, Ag and the Cu-Ag alloy are utilized. On occasions, there are instances in which results brought about are even worse. Thus, the fact is that the only way out is to carry out the reaction at the lowest possible temperatures.

If examples of proposals regarding the liquid phase oxidation of ethylbenzene to ethylbenzene hydroperoxide by means of molecular oxygen are presented, one is that of U.S. Pat. 2,867,666. This patent proposes to carry out the reaction in the presence of a basic substance such as the alkali metal carbonates, alkaline earth metal carbonates and alkaline earth metal oxides under substantially anhydrous conditions for neutralizing the troublesome by-product acid substances. It further holds that stainless steel can be used in the case that the reaction is carried out under substantially anhydrous conditions.

On the other hand, in Belgian Pat. No. 677,029, the partial pressure of oxygen above the reaction liquid phase is held to be important, and it proposes to carry out the reaction in the absence of aqueous alkali solution under conditions that said partial pressure becomes 0.01–25 p.s.i. (absolute pressure).

As briefly described hereinbefore, in the liquid phase oxidation of ethylbenzene by means of molecular oxygen, various proposals have been made to date, including some which are contradictory. In any event, there existed the technical problem of mutual incompatibility in that if it is intended to enhance the conversion of the ethylbenzene to the intended ethylbenzene hydroperoxide in the reaction zone by raising the reaction speed, elevated temperatures must be employed, whereas the employment of elevated temperatures gave rise to an increase in the formation of troublesome by-product acid substances and the setting up of an explosive decomposition reaction. Hence, the solution of this problem and the establishment of a method by which this oxidation reaction could be carried out commercially with advantage has been desired.

As a result of my researches with a view to solving this difficult problem, I found that in the case of isopropylbenzene the influence that the rise in the reaction temperature had on the troublesome decomposition reaction of the intended isopropylbenzene hydroperoxide was much greater than that had on the autoxidation reaction by which the isopropylbenzene was oxidized to the intended hydroperoxide, whereas in the case of autoxidation of ethylbenzene with molecular oxygen, the activation energy of the reaction by which the ethylbenzene hydroperoxide was formed was greater than that of all the further side reactions that the hydroperoxide was exposed to, including the troublesome oxidation and decomposition thereof or the reaction by which the intended autoxidation was stopped, i.e., the influence of the rise in temperature in the case of the liquid phase oxidation of ethylbenzene by means of molecular oxygen was favorable for the formation of ethylbenzene hydroperoxide. If in the case of the autoxidation reaction of ethylbenzene, attempts were made to check the undesirable decomposition of the resulting product by lowering the reaction temperature in concomitance with the progress of the reaction, as employed in the case of isopropylbenzene, the overall speed of the autoxidation reaction would decline. Thus, it was found that the means recommended for the oxidation of isopropylbenzene could not be used for improving the oxidation of ethylbenzene.

It was further found that the technical problem of mutual incompatibility i.e., that even though the conversion of the ethylbenzene to the intended hydroperoxide could be enhanced by raising the reaction speed, as hereinbefore described, by raising the reaction temperature, the increase in the formation of the troublesome by-product acid substances and the setting up an explosive decomposition reaction could not be avoided could be solved by the use of a titanium reaction vessel, a proposal which had never been made heretofore in connection with this reaction; and I found that by carrying out the liquid phase oxidation under the conjoint conditions of a reaction zone formed by this titanium and an elevated temperature reaction condition which had heretofore been impossible of practice commercially, combined with a substantially anhydrous condition (which means that water is not added from the outside of the system, e.g. such as addition of an aqueous alkali solution), and further preferably without the copresence of an alkaline substance, the intended ethylbenzene hydroperoxide could be stably present and the setting up of side reactions could be prevented even at such concentration of the resulting hydroperoxide and reaction zone temperatures at which it was natural to expect the setting up of an explosive decomposition, if the hereinabove noted conjoint conditions were not adopted.

Additionally, I found that a procedure which consists of condensing the unreacted ethylbenzene-containing vent gas from the reaction zone using, say, a reflux condenser and then directly recycling the condensate to the reaction zone, or after having removed the water therefrom, should be avoided, but instead the vent gas should be taken out from the reaction zone under uncondensed conditions and while still in its substantially gaseous phase be conducted from said reaction zone to an alkali treatment zone where it is quenched by being contacted with a cold aqueous alkali solution. By operating in this manner, it was found that the by-product acid decomposition products which are formed could be dissolved efficiently in the aqueous alkali solution and be conducted externally of the reaction system and thus the accumulation of the troublesome decomposition products in the reaction zone could be prevented and moreover the condensation of the unreacted ethylbenzene and the alkali washing action could be carried out concurrently. It was further found that the gaseous phase which does not condense forms a phase containing either moisture or mist and the possibility of the formation of an explosive gas mixture was completely avoided. Furthermore, it was found that since this cold aqueous alkali solution treatment was carried out in a zone independent of the reaction zone, the alkaline substance and water have no effect at all on the reaction system and thus the conditions desired in the reaction zone, i.e., that it is substantially anhydrous and that preferably alkaline substances are absent, are ingeniously ensured.

It is therefore an object of this invention to provide a process for producing ethylbenzene hydroperoxide commercially with great advantage by carrying out the liquid phase oxidation of ethylbenzene by means of molecular oxygen under the hereinbefore described condition (i)–(iii).

The many other objects and advantages of the invention will become apparent from the following description.

According to this invention, the reaction is carried out in a reaction vessel made of titanium or a titanium lined material, i.e., in a reaction zone at least that part thereof which the liquid ethylbenzene comes into contact with is formed of titanium. The reaction temperature employed ranges from the boiling point (136° C.) of ethylbenzene to 200° C., preferably 150°–180° C. and more preferably 165°–175° C. In the liquid phase oxidation of ethylbenzene by means of molecular oxygen, a temperature, say, of 125°–165° C. has been proposed in the past but owing to explosive decomposition and other reasons, such as previously noted, the temperature commercially possible was ca. 150° C. at the most, and it was entirely unexpected that operations were possible at temperature exceeding 165° C.

According to this invention, the requisite conditions for carrying out the specific reaction contemplated by the invention comprises the conjoint conditions of the employment of a reaction zone of titanium material, as indicated hereinbefore, and elevated temperature such as indicated hereinbefore—proposals which have never been made hitherto—as well as the condition that the reaction be carried out under substantially anhydrous conditions. In addition to the foregoing conjoint conditions, it is especially preferred that the reaction is carried out without the operation of adding an alkaline substance to the reaction system to effect by its presence therein the neutralization of the by-product acid decomposition products which are formed in the system, i.e., that the reaction is carried out in the absence of alkaline which is in contradiction to the proposals which have been made heretofore.

Thus the reaction is operated at an elevated temperature and completed in a short period of time. The reaction is carried out by blowing into the liquid ethylbenzene an excess of molecular oxygen under pressure conditions exceeding normal atmospheric pressure. While air is usually used as the molecular oxygen, also usable are oxygen gas, gas mixtures of oxygen with an inert gas, e.g., nitrogen, argon, and carbon dioxide or a gas mixture of air and oxygen. Hence, the term "molecular oxygen" is meant to include the foregoing molecular oxygen-containing gases.

One instance of test results showing the effects of the material of which the reaction zone is fabricated is presented in Table I, below. The results are those obtained by carrying out the reaction exactly in accordance with the invention process except that the material of the reaction zone was varied.

zene hydroperoxide becomes much higher when the feed of the molecular oxygen is increased (and hence the

TABLE I

| Reaction temperature °C. | Reactor of stainless steel | | Reactor lined with Cu-Ag alloy | | Glass-lined reactor | | Titanium-lined reactor | |
|---|---|---|---|---|---|---|---|---|
| | EHP$_{max.}$ (percent) | Time required (hrs.) | EHP$_{max}$ (percent) | Time required (hrs.) | EHP$_{max.}$ (percent) | Time required (hrs.) | EHP$_{max.}$ (percent) | Time required (hrs.) |
| 135 | 18.0 | 16 | 16.5 | 15 | 14.0 | 13.5 | | |
| 145 | ¹15.6 | 6 | 13.0 | 5 | 14.5 | 6.5 | | |
| 155 | ¹14.0 | 1.9 | ¹12.5 | 2 | 15.0 | 4.0 | 16 | 3⅔ |
| 165 | | | ¹11.0 | 1.5 | 18.5 | 2.4 | 21 | 2 |
| 170 | | | | | 16.5 | 1.5 | 20 | 1.5 |

¹ Abrupt decomposition took place simultaneously upon attaining the aforesaid EHP$_{max.}$, the degree of which was beyond control.

The operation was carried out with a pressure of 10 kg./cm.² inside the reaction zone.

NOTE.—EHP$_{max.}$ represents the maximum concentration attained by the resulting ethylbenzene hydroperoxide. (Applicable also to the subsequently given tables.)

Time required shows the time required to attain the aforesaid EHP$_{max}$. (Applicable also to the subsequently given tables.)

It can be seen from the results given in Table I, above, that in the case of a reaction vessel made of the usual materials, inclusive of the materials that have been proposed heretofore, a considerably prolonged reaction time is required for raising the concentration of the resulting ethylbenzene hydroperoxide, whereas if it is attempted to shorten the reaction time, a violent uncontrollable decomposition reaction of the product is set up at a concentration lower than the foregoing concentration to render the operations practically impossible. On the other hand, in the case of a reaction zone constituted of a titanium material and under the conjoint conditions in accordance with the invention process, operations at an elevated temperature and of a short period can be adapted without such fears, and it is possible to attain high concentrations for the intended product. While it has not been shown in Table I, above, the ethylbenzene hydroperoxide in the products obtained in the instances marked with the asterisk, after having reached the EHP$_{max.}$, was completely decomposed in about one hour thereafter and became essentially zero. On the other hand, in the case of a glass-lined reaction vessel there is an improvement over the instances of the reaction vessel made of stainless steel or that lined with a Cu-Ag alloy, but they still are not match for the reaction vessel according to the invention process. Further, in the case of glass lining, it is difficult to form a reaction zone which can treat large quantities of reactants or a commercial scale and, in addition, it is difficult to fabricate an apparatus having a pressure resistance exceeding, for example, 10 kg./cm.². And furthermore the possibility of breakage is great. Thus, there is the drawback that it is a disadvantage commercially from the standpoints of both operations and equipment.

According to the invention process, the reaction is so operated as to introduce the molecular oxygen into the reaction zone in an especially excessive amount. This is of especially favorable significance under the conditions of combination with the various other conditions. While the reasons therefor are not clear, the yield of the ethylbenzene hydroperoxide becomes much higher when the feed of the molecular oxygen is increased (and hence the amount of molecular oxygen vent also increases) under the combined conditions according to the invention process. Moreover, since the operations is carried out at elevated temperatures, it also serves to promote to a still greater degree the effect of driving out from reaction zone in an uncondensed state the by-product acid decomposition products which possibly are formed therein. The fact that the reaction is carried out in the absence of alkaline substances, an especially desirable condition in this invention, also serves to promote this expulsion effect. The operation is conveniently carried out with the pressure of the reaction zone in a range of usually normal atmospheric pressure to about 20 kg./cm.².

In Table II, below, is presented one example of the results of an experiment showing the improvement effects resulting from the choice of the condition which calls for using the molecular oxygen in an excessive amount. In this experiment the invention process was carried out at a reaction temperature of 165° C. and a pressure of 15 kg./cm.², while varying the amounts fed of the molecular oxygen.

TABLE II

| | | | | When the concentration of the resulting ethylbenzene hydroperoxide in the reaction product was 10% by weight | | | | |
|---|---|---|---|---|---|---|---|---|
| Feed O₂ (percent) | Vent O₂ (percent) | EHP$_{max.}$ (percent) | Time required (hrs.) | Amount of by-products (percent by weight) | | | | Yield of intended product (percent) |
| | | | | Benzoic acid | Acetophenone | | Carbinol | |
| 9.5 | 7.0 | 16.5 | 4.3 | 0.08 | 1.10 | | 1.05 | 79.6 |
| 13.6 | 11.2 | 19.8 | 2.5 | 0.07 | 0.87 | | 0.73 | 83.9 |
| 16.4 | 14.0 | 20.3 | 2.5 | 0.05 | 0.76 | | 0.56 | 86.4 |
| 21.0 | 15.1 | 21.0 | 2.0 | 0.06 | 0.66 | | 0.45 | 88.1 |
| 25.0 | 16.3 | 22.1 | 1.8 | 0.04 | 0.55 | | 0.37 | 90.1 |

NOTE.—Feed O₂ (percent) represents the volume percent of O₂ fed. Vent O₂ (percent) represents the volume percent of O₂ in the discharged gas.

It is apparent from the results given in Table II, above, that the ethylbenzene hydroperoxide is formed in a shorter period of time and better yield as the concentration of the oxygen in the vent gas becomes greater.

According to the invention process, the reaction is carried out under a substantially anhydrous condition and, in addition, it is preferably operated in the absence of alkaline substance, i.e., without adding alkaline substances for neutralizing the acid substances which possibly are formed as by-products.

In Table III, is presented one example of the results of an experiment showing whereas an alkaline substance Na$_2$CO$_3$ was added to the reaction system under a substantially anhydrous condition while varying its amount. The reaction was carried out at a reaction temperature of 165° C. and a pressure of 10 kg./cm.². One liter of ethylbenzene was used and the amount fed of the air was 360 liters (standard condition) per hour.

TABLE III

| Amount added of Na₂CO₃ (grams) | EHP_max. (percent) | Time required (hrs.) | When the concentration of the resulting ethylbenzene hydroperoxide in the reaction product was 17% by weight | | | Yield of intended product (percent) |
|---|---|---|---|---|---|---|
| | | | Amount of by-products (percent by weight) | | | |
| | | | Benzoic acid | Acetophenone | Carbinol | |
| 0 | 21 | 2 | 0.12 | 2.0 | 0.93 | 82.6 |
| 1.5 | 20 | 2 | 0.14 | 2.95 | 1.43 | 76.6 |
| 3.0 | 19.6 | 2.3 | 0.15 | 3.05 | 1.65 | 75.3 |
| 10.0 | 18.2 | 2 | 0.17 | 4.00 | 2.05 | 70.4 |

It can be seen from the results given in Table III, above, that in contradiction to the proposals made heretofore there is a tendency towards an increase in the formation of by-products and a decline in the yield of the intended product when an alkaline substance is added and is present in the reaction system, even though the other requisites of the invention are satisfied, and that hence under the conjoint conditions of the invention the operation of the reaction in the absence of alkaline substances is especially to be recommended. The foregoing tendency is aggravated when both the alkaline substance and water are caused to be present in the system.

A condensing condition wherein the ethylbenzene-containing vent gas discharged from the upper part of the reaction zone is cooled, for example, by being in direct communication with a reflux condenser disposed above the reaction zone, and thereafter recycled, as such, to the reaction zone, or after separation of the water therefrom, must not be adopted. According to the invention process, the ethylbenzene-containing vent gas is taken out from the reaction zone under non-condensing conditions in conjunction with the hereinbefore described various reaction conditions and, while maintaining its substantially gaseous phase, is conducted from the reaction zone to an independent alkali treatment zone where it is quenched by means of direct contact with a cold aqueous alkali solution. By this operation, the by-product containing the acid decomposition products which has been driven out positively from the reaction zone by means of the already described various reaction conditions is not only fixed but also the alkali washing of the ethylbenzene is carried out until a state is reached wherein the unreacted ethylbenzene is condensed and the separation of the by-products therefrom is facilitated and, in addition, the gaseous phase which does not condense becomes a mixed system containing a moisture or mist of water and of such a temperature that it does not form an explosive gas mixture. The aqueous alkali solution used is one whose pH is above 8, and usually 8–11 and the quenching is carried out to a temperature below 40° C., and preferably below 30° C.

Thus in the case where the method adopted in carrying out the reaction using an excess of a molecular oxygen-containing gas is one in which the vent gas, after being discharged externally of the reactor, is, for example, as customarily practiced, passed through an indirect condenser and thereafter discharged, there is the danger that the explosion limit is inevitably reached at a point where the partial pressure of the hydrocarbon in the vent gas which has been cooled in the condenser decreases. However, this danger can be ingeniously avoided in the invention process by the cooling action by washing with a cold aqueous alkali solution in the alkali treatment zone which is independent of the reaction zone.

This quenching by means of the direct contact of the gas with the cold aqueous alkali solution can be carried out by flowing the cold aqueous alkali solution from the top of a multistage washing tower and contacting it with the vent gas countercurrently, therewith or effecting the flowing contact of the cold aqueous alkali solution and the vent gas countercurrently in a coiled passage or spraying the cold aqueous alkali solution countercurrently or flowing the vent gas into the cold aqueous alkali solution. Further, it is also possible to either combine or suitably modify these means in carrying out the quenching operation. A condenser which cools the gas indirectly cannot be directly utilized in the invention process. However, if desired, it is permissible, provided that it is within the range in which the explosion limit will not be reached, to first condense and remove from the vent gas a part of the hydroperoxide and unreacted starting material, which come admixed in the gas, and thereafter conduct the remaining vent gas to the alkali treatment zone to be given the cold aqueous alkali treatment.

Next, a typical mode of practicing the invention will be fully described with reference to the accompanying drawing. The figure illustrates a flow sheet for practicing the invention process with the disposition of the zones and apparatuses being shown schematically therein. In the figure, I is the reactor constituting the reaction zone, at least that part of the inside of which comes in contact with the liquid ethylbenzene being made of a titanium material. Usually, the practice is to provide a titanium lining throughout the entire inside wall of the reactor. Further, the reactor has a heating jacket (not shown), the reaction temperature being adjusted by means of heating medium inside said jacket. The reactor has a feed line 1' and a molecular oxygen blow line 2. The ethylbenzene-containing vent gas is drawn from the reactor I under non-condensing conditions and while still in its substantially gaseous phase, passes via the vent gas line 3 to be conducted into an alkali washing tower II, which is independent of the reactor I and constitutes the alkali treatment zone. In the embodiment shown, the alkali washing liquid is cooled at the condenser provided in the cycling line 5 and is then conducted to the top of the tower II. At the tower II the vent gas is cooled by being subjected to a washing operation by means of a large quantity of the cold aqueous alkali solution, and a substantially major portion of the unreacted ethylbenzene is liquified. For maintaining the pH of the wash liquid at preferably above 8, and usually pH 8–11, the aqueous alkali solution is replenished via line 5', and for maintaining the liquid level constant in the tower II, which, along with lines 4 and 5, the condenser and line 5", forms a cycling system, the excess wash liquid is discharged via line 6 into a separator III which separates the liquid into an ethylbenzene layer and a water layer. The water layer containing the neutralized by-product acid substances leaves the separator III via line 8. On the other hand, the waste gas is discharged via line 13. The ethylbenzene layer separated by the separator III is conducted via line 7 to a drying tower IV where it is dehydrated by means of, say, alumina or silica gel and thereafter is cycled to an oxidation reactor I in a substantially anhydrous state. The provision of a drying tower in the line 1 for feeding the ethylbenzene to the reactor is desirable, but when the water contained in the starting material is so small as to be negligible, this is not necessary. The rate of feed of the starting ethylbenzene to the reactor I is suitable chosen in accordance with such as the oxidation reaction conditions. For example, when the ethylbenzene is to be reacted at 165° C. and a pressure of 10 kg./cm.², the reaction product after an average holding time of 30 minutes is taken out of the concentrator V via the bottom of the reactor I and the line 10. It is possible to make the concentration of the ethylbenzene hydroperoxide at least 10% by weight and the yield at 85%. It is also possible to provide an alkali washing tower at an intermediate point along the line 10 and thus enhance to a marked degree, the thermal stability of the concentrated hydroperoxide to be taken out from the bottom of the concentrator via line 11. Again, the hot reaction liquid coming out from the reaction tower can be flash concentrated at the concentrator V with submitting it to the alkali washing. In this case, it is best to conduct the recovered unreacted ethylbenzene to the alkali washing tower VI via line 12 and, after its washing, drying it and recycling it to the reaction tower. As shown in the figure, in carrying out this washing, a wash liquid can be used cycled via a line 9.

One mode of practicing the invention process has been described hereinbefore with reference to one illustration of a flowsheet thereof, but various modifications are possible without departing from the spirit of the invention.

Further, aside from the numerous advantages previously stated, according to the invention process, the equipment used can be made exceedingly compact and large-scale treatments can be carried out. Hence, the invention process is exceedingly advantageous from the standpoint of equipment costs.

The following examples of several modes of practicing the invention process are given to further illustrate the invention. The yield, as referred to in the examples was computed in the following manner;

$$\text{Yield} = \frac{\text{Number of moles of ethylbenzene hydroperoxide formed}}{\text{Number of moles of ethylbenzene consumed}} \times 100 \text{ (percent)}$$

EXAMPLE 1

An oxidation reaction was carried out using a heating jacket-equipped 3-liter autoclave apparatus made of titanium, the inside diameter and height of which were 100 mm. and 400 mm., respectively, and which was provided with a material feeding inlet and at its bottom a blow pipe for blowing in air, and further in the upper flange a line for vent gas leading to an alkali washing tower and in the lower flange a differential pressure transmitter for the liquid level meter and a liquid level adjusting valve. The reaction temperature was maintained by a heating medium which flowed through the reactor jacket by being circulated from a constant temperature tank. The reaction pressure was adjusted by means of the pressure adjusting valve of the vent gas. The vent gas from the autoclave was discharged into an aqueous alkali solution at the lower part of the inside of Raschig ring-packed pressure washing tower whose height was 1000 mm. and inside diameter was 100 mm. An aqueous 0.5% sodium carbonate solution was cycled to the washing tower by means of a circulation pump and was brought into direct contact with the vent gas thereby cooling and condensing the ethylbenzene present in said gas as a vapor. A pressure adjusting valve was provided at the top of said washing tower and was adjusted to function at a pressure slightly lower than the internal pressure of the reactor. It was so operated as to ensure that ethylbenzene was not contained in the waste gas going to the outside of system in an amount such as to be detectable. The wash liquid was replenished with an aqueous solution of sodium carbonate so as to maintain the pH of the former at above 9, and the wash liquid was cooled and cycled through the circulatory line by the provision of a condenser therein. For ensuring that the liquid level of the wash liquid was maintained constant in the washing tower, the wash liquid was discharged to a separator via a liquid level adjusting valve. An orifice mixer was provided at the outlet of the circulation pump leading to the separator and thus the uniform and through mixing of the aqueous sodium carbonate solution with the condensate containing the condensed ethylbenzene and the condensed by-product acids was accomplished and the alkali washing effect was enhanced.

The continuous production of ethylbenzene hydroperoxide by means of the oxidation of ethylbenzene was carried out using the hereinabove described apparatus and reaction procedure. The reaction was carried out such that the average holding time would be 40 minutes by feeding the starting ethylbenzene at the rate of 1500 grams per hour and at a temperature of 165° C. and a pressure of 10 kg./cm.$^2$. The amount of air blown in was 500 liters per hour under the standard condition. The vent gas from the oxidation reactor contained 13% oxygen and 10% hydrocarbons. This gas was conducted to the pressure washing tower where an aqueous 0.5% sodium carbonate solution of 30° C. flowing through said tower at the rate of 30 liters per hour was brought into contact with said gas countercurrently. Hydrocarbon could not be detected in the waste gas leaving the washing tower. The washed condensate was passed through the aforesaid separator and ethylbenzene was recovered at the rate of 200 grams per hour, which was then recycled to the reactor via the drying tower.

As a result of a continuous 48-hour operation, an average of 1524 grams of the product per hour was obtained. The product contained 170 grams of ethylbenzene hydroperoxide and 9 grams of acetophenone, alpha-phenetyl alcohol and other substances, and the yield of the ethylbenzene hydroperoxide was 84.5%.

EXAMPLE 2

Ethylbenzene was oxidized using the apparatus of Example 1 and under identical conditions. The reaction was carried out by blowing in oxygen gas at the rate of 100 liters per hour the standard condition, while 500 liters per hour under the standard condition, of nitrogen gas was blown into the gaseous phase at the upper part of the reactor. With an average holding time of 40 minutes 1500 grams per hour of ethylbenzene were fed and 1,539 grams per hour of the product were obtained. The product contained 185 grams of ethylbenzene hydroperoxide and 21 grams of acetophenone, alpha-phenetyl alcohol and other substances, and the yield of the ethylbenzene hydroperoxide was 85%. The ethylbenzene recovered from the washing tower was recycled to the reactor via the drying tower at the rate of 130 grams per hour.

EXAMPLE 3

Ethylbenzene was oxidized using the apparatus of Example 1. The liquid level was adjusted such that the average holding time would be about 25 minutes and ethylbenzene was fed at the rate of 2500 grams per hour and 2362 grams per hour of the product were obtained. The product contained 324 grams of ethylbenzene hydroperoxide and 46 grams of acetophenone, alpha-phenethyl alcohol and other substances, and the yield of the ethylbenzene hydroperoxide was 81.5%. The vent gas to the cool washing tower contained 12.7% $O_2$ gas and 230 grams of ethylbenzene recovered from the washing tower were recycled to the reactor via the drying tower.

What is claimed is:

1. In a process for producing ethylbenzene hydroperoxide by liquid phase oxidation of ethylbenzene by means of an excess of molecular oxygen under pressure in excess of normal atmospheric pressure, the improvement which comprises
    (1) carrying out the liquid phase oxidation in a reaction zone under anhydrous conditions at a temperature of 150–180° C., and at least that portion of the reaction zone with which the liquid ethylbenzene comes into contat being made of titanium,
    (2) taking out the ethylbenzene-containing vent gas from the reaction zone, introducing the vent gas into an alkali treatment zone which is independent of the reaction zone, quenching the vent gas by contacting it with a cold aqueous alkali solution having a pH of at least 8 to form a condensate, separating a layer containing ethylbenzene from the condensate, recycling said separated fraction containing ethylbenzene to the reaction zone, discharging the remaining aqueous solution layer and waste gas externally of the alkali treatment zone, and (3) taking out from the reaction zone a liquid layer containing ethylbenzene hydroperoxide.

2. The process according to claim 1 which is characterized in that (i) said oxidation is carried out by continuously and separately feeding the molecular oxygen and liquid ethylbenzene into said reaction zone, (ii) the ethylbenzene-containing condensate from said alkali treatment zone is continuously taken out, following which said condensate is separated into an ethylbenzene layer and a water layer, and thereafter the ethylbenzene layer is recycled to said reaction zone, and (iii) the ethylbenzene hydroperoxide-containing liquid layer is taken out from said reaction zone.

3. The process according to claim 1, wherein the vent gas is quenched to a temperature below 40° C.

4. The process according to claim 3 wherein the pH of said alkali solution is 8–11 and the temperature to which said vent gas is quenched is below 30° C.

5. The process according to claim 1 wherein said reaction temperature is 165°–175° C.

References Cited

UNITED STATES PATENTS

| | | | |
|---|---|---|---|
| 2,845,461 | 7/1958 | Winkler et al. | 260—610B |
| 2,862,973 | 12/1958 | Winkler et al. | 260—610B |
| 2,867,666 | 1/1959 | Erickson et al. | 260—610B |
| 2,744,149 | 5/1956 | Enos | 260—610 |
| 2,967,891 | 1/1961 | Holden | 260—610 |

FOREIGN PATENTS

| | | | |
|---|---|---|---|
| 1,491,518 | 3/1967 | France | 260—610B |
| 872,104 | 7/1961 | Great Britain | 260—610B |

BERNARD HELFIN, Primary Examiner

W. B. LONE, Assistant Examiner

U.S. Cl. X.R.

260—592, 618C, 515R